(12) United States Patent
van Zijl

(10) Patent No.: US 8,429,850 B2
(45) Date of Patent: Apr. 30, 2013

(54) METHOD AND DEVICE FOR GROWING A PLANT

(76) Inventor: Fred van Zijl, Poeldijk (NL)

( * ) Notice: Subject to any disclaimer, the term of this patent is extended or adjusted under 35 U.S.C. 154(b) by 379 days.

(21) Appl. No.: 12/666,502

(22) PCT Filed: Jun. 5, 2008

(86) PCT No.: PCT/NL2008/050353
§ 371 (c)(1), (2), (4) Date: Mar. 24, 2010

(87) PCT Pub. No.: WO2008/150166
PCT Pub. Date: Dec. 11, 2008

(65) Prior Publication Data
US 2010/0192458 A1 Aug. 5, 2010

(30) Foreign Application Priority Data

Jun. 6, 2007 (NL) ...................................... 2000684

(51) Int. Cl.
*A01G 31/00* (2006.01)
*A01G 31/06* (2006.01)

(52) U.S. Cl.
USPC ............................................ 47/62 R; 47/66.7

(58) Field of Classification Search ............ 47/63, 59 R, 47/62 R, 62 A, 65, 66.7, 58.1 R
See application file for complete search history.

(56) References Cited

U.S. PATENT DOCUMENTS

| | | | | |
|---|---|---|---|---|
| 3,909,978 A * | 10/1975 | Fleming | ............................ | 47/82 |
| 3,931,695 A * | 1/1976 | Widmayer | ................... | 47/59 R |
| 3,973,353 A * | 8/1976 | Dedolph | ........................... | 47/65 |
| 4,255,897 A * | 3/1981 | Ruthner | ............................ | 47/65 |
| 4,278,625 A * | 7/1981 | Dedolph | ........................ | 264/39 |
| 4,317,308 A * | 3/1982 | Derrick et al. | .................... | 47/1.1 |
| 5,515,648 A * | 5/1996 | Sparkes | ............................. | 47/65 |
| 5,862,628 A * | 1/1999 | Takashima | ..................... | 47/65.8 |
| 5,956,897 A * | 9/1999 | Takashima | ........................ | 47/60 |
| 6,233,870 B1 * | 5/2001 | Horibata | ...................... | 47/62 R |
| 6,378,246 B1 * | 4/2002 | DeFoor | ......................... | 47/62 R |

(Continued)

FOREIGN PATENT DOCUMENTS

| | | |
|---|---|---|
| EP | 1 166 621 | 1/2002 |
| FR | 2 815 332 | 4/2002 |
| WO | 2006/096650 | 9/2006 |

OTHER PUBLICATIONS

International Search Report dated Oct. 1, 2008, from corresponding PCT application.

*Primary Examiner* — Son T Nguyen
*Assistant Examiner* — Shadi Baniani
(74) *Attorney, Agent, or Firm* — Young & Thompson

(57) ABSTRACT

Method and device for growing a plant. In particular, a device intended for accommodating the quick-growing stem of tomato, cucumber and sweet pepper plants. It is proposed to wind up the stem from the bottom in such a manner that the plant continuously extends in the cultivation space at the same height. Winding up of the stem in a simple manner is possible, as a result of which the latter extends about the winding point in a coiled manner. The end of the stem is arranged in a substrate carrier, such as a gutter, which also rotates. According to another variant, the stem is pressed into substrate material during winding up, resulting in the plant forming roots, so that the part of the stem which is already developed can be cut off.

10 Claims, 4 Drawing Sheets

U.S. PATENT DOCUMENTS

| | | | |
|---|---|---|---|
| 6,604,321 B2* | 8/2003 | Marchildon | 47/62 R |
| 6,804,912 B2* | 10/2004 | van Weel | 47/62 R |
| 6,928,772 B2* | 8/2005 | Bai et al. | 47/62 R |
| 7,181,886 B2* | 2/2007 | Bourgoin et al. | 47/62 A |
| 7,188,451 B2* | 3/2007 | Marchildon | 47/59 R |
| 7,533,493 B2* | 5/2009 | Brusatore | 47/82 |
| 7,730,663 B2* | 6/2010 | Souvlos et al. | 47/62 C |
| 2003/0121205 A1* | 7/2003 | van Weel | 47/58.1 R |
| 2005/0055878 A1* | 3/2005 | Dumont | 47/62 R |
| 2008/0209806 A1* | 9/2008 | Van Zijl | 47/70 |
| 2008/0271373 A1* | 11/2008 | Fukuyama et al. | 47/66.7 |
| 2009/0165373 A1* | 7/2009 | Souvlos et al. | 47/65 |

* cited by examiner

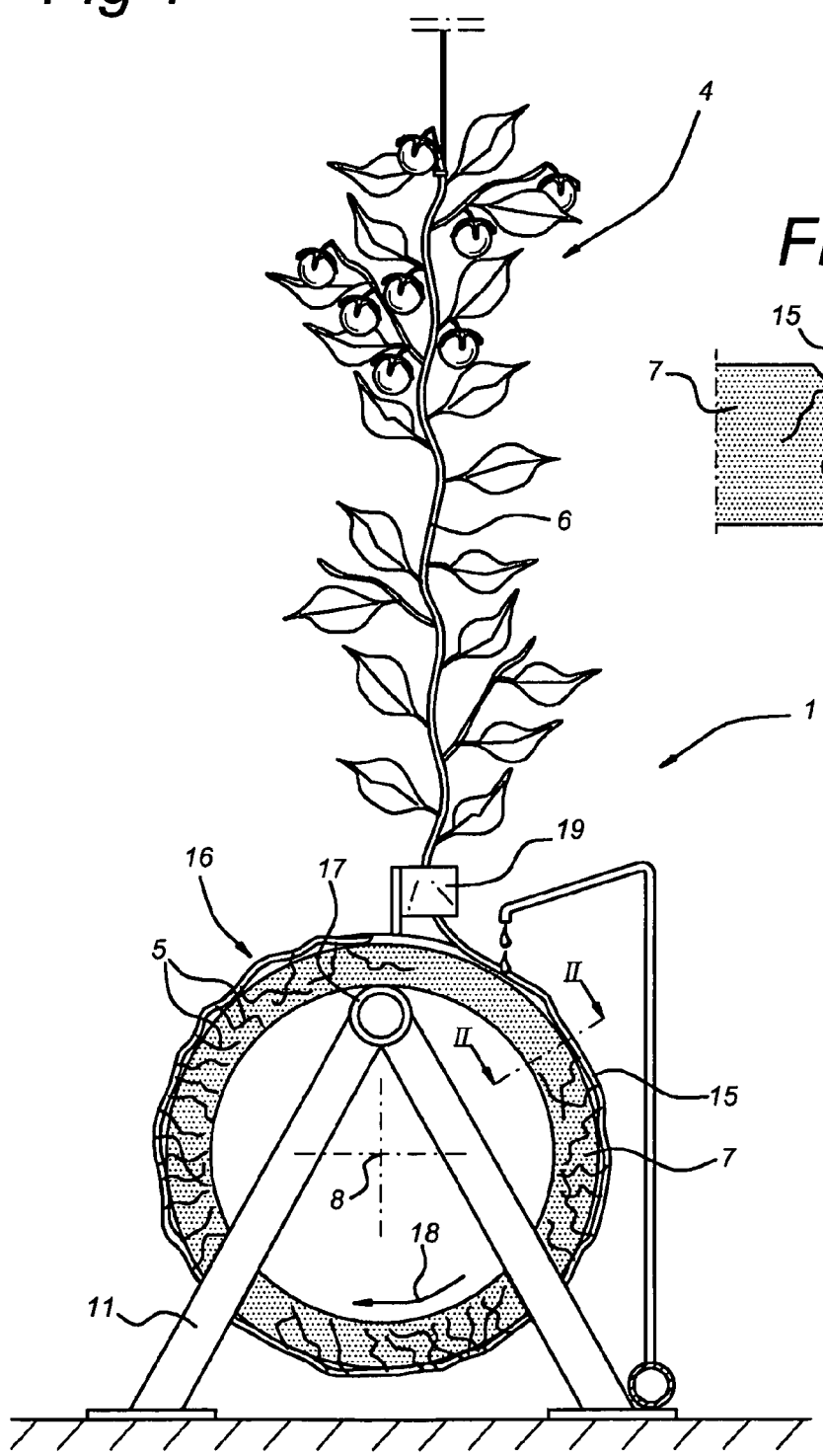
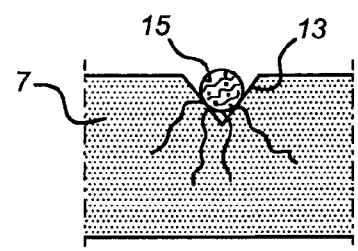
Fig 1
Fig 2

METHOD AND DEVICE FOR GROWING A PLANT

BACKGROUND OF THE INVENTION

1. Field of the Invention

The present invention relates to a method for growing a plant.

More particularly, the present invention relates to a method for growing quick-growing plants, such as sweet peppers, cucumbers, tomatoes and aubergines. Therein the roots of the plant are situated in substrate material and as a result of the fact that the height of the plant steadily increases and the highest point of a greenhouse or other cultivation space is reached, measures have to be taken. These comprise lateral displacement of the respective plant which is effected by means of a complex system of suspension cords which move each plant on a regular basis. In this case, the lowest part of the stem is no longer used for bearing fruit. The leaves thereof are therefore removed therefrom and this lowest part of the stem is only used for passing fluids from the roots to the leaves and fruits.

2. Description of the Related Art

Moving the plant is a particularly labour-intensive activity and, in this connection, there are also a large number of stems near the bottom of the cultivation space, which take up a considerable amount of space.

The prior art has tried to overcome this drawback by changing the location of the roots during the growing of the plant. Attempts have been made to make the horizontal part of the stem take root, so that that part of the stem which is further "downstream" can be cut away. However, it has been found that it is not easy make a plant grow roots and special measures have to be taken which lead to the construction becoming even more complicated. In any case, it is still necessary to move the plant in the cultivation space and this has to be carried out plant by plant. An example thereof can be found in EP 1,166,621.

WO 2006/096650A discloses a structure in which pot plants are subjected to a rotating movement in their entirety.

SUMMARY OF THE INVENTION

It is an object of the present invention to avoid this drawback and to provide a more effective method of cultivation for the abovementioned plants and other quick-growing plants.

According to the present invention, the stem of the plant which no longer bears fruit is wound up. It has been found that, if the radius of curvature is chosen to be sufficiently large, such stems can readily be wound up. The radius of curvature used for winding up obviously depends on the type of plant. The diameter used for winding up the stem of a sweet pepper will be larger than that used for the stem of a tomato plant as the stem of a sweet pepper is less flexible. By way of example, a winding diameter of 40-100 cm and more particularly approximately 50-60 cm and more particularly of approximately 55 cm is mentioned. This diameter also depends on the manner in which winding up takes place. The part which does bear fruit will only be subjected to a substantially vertical lowering movement, that is to say it is not subjected to the winding-up operation.

By winding up the plants in this manner, it is possible to lower a number of plants simultaneously. This means that it is no longer necessary to treat the crop plant by plant, as a result of which significant savings in labour costs can be achieved.

Winding up preferably takes place about an (imaginary) roll, the axis of rotation of which is substantially horizontal. Thus, it is possible to wind up a number of plants simultaneously. It will be understood, however, that any other orientation of the roll axis is conceivable.

According to a first variant of the invention, the stem is wound onto a substrate material which has a particular embodiment. This means that the stem is preferably placed against the substrate material, with the substrate material regularly being provided with moisture and nutrients. It has been found that under such conditions the stem starts to strike root upon contact with the substrate material. As the stem preferably extends along a ring part of substrate material, it is possible, depending on the winding speed and whether there are sufficient new roots, to decide to cut off a downstream part of the stem.

In another variant, the substrate is (partially) made from flexible material and comprises a keyhole-shaped opening which is open to the outside, so that the stem does not rest against the substrate with just one side, but with several sides and preferably with all sides. If the substrate material is able to absorb and release moisture, the stem is provided with moisture and nutrients on all sides in this way.

In this manner, there are no longer any very long stems which take up a large amount of space in the cultivation space. At the same time, it is not necessary to take special measures in order to ensure that the roots grow when the stem is wound up.

Depending on circumstances, the winding-up procedure can be carried out in a continuous manner, but also in stages. In addition, it is possible to pass the stem through a processing device before it is wound up. Such a processing device may comprise a cutting device for removing leaves and other plant parts which extend from the stem.

The plant may be supported in any manner known in the prior art. An example thereof may be found in Netherlands patent 1029401 in the name of Fred van Zijl.

The winding may comprise a number of turns, but it is also possible for the winding to comprise only a part of a complete turn. By metered control of, for example, the dispensing of water, it is possible to ensure that a specific part of a winding does not receive any water and thus dies naturally, as a result of which it can be removed at all times in a simple manner.

In a second variant of the present invention, the location of the root with respect to the stem remains unchanged. In this case, the root is situated in substrate and the substrate is rotated regularly. The substrate can, for example, be present in a cultivation gutter on which a number of plants, such as tomatoes, may be arranged one behind the other. Around this cultivation gutter, a number of elongate elements extend which together form an imaginary cylinder of the above winding diameter. The cultivation gutter is turned continuously or intermittently, together with the elongate elements. It is preferable to turn the cultivation gutter intermittently, i.e. in each case by 360°, so that a significant length of stem can be wound around the elongate elements. Preferably, this length is chosen so that sufficient storage can be provided by winding only a few times a year. By way of example, winding three times a year by a complete turn is mentioned.

The present invention prevents plant stems from adjacent plants touching each other. As a result, it is possible to prevent the transmission of diseases. In addition, it is possible to limit the damage to the fruit, as the above-described treatment is quite gentle on the plant. With the last variant, it is possible that a spiral of adjacent stem parts of a stem results if winding is carried out several times.

The invention also relates to a device for growing a plant, comprising a plant carrier provided with a recess for receiving substrate, embodied for receiving a root portion of a plant, in which said recess is embodied so as to receive said substrate in a retaining manner, wherein said plant carrier is embodied so as to be rotatable and comprises means for supporting plant material which is wound up during rotation, which device comprises a further plant carrier for receiving a stem portion of a plant, said further plant carrier being non-rotatably arranged near said rotatable plant carrier.

The further plant carrier may comprise any suitable construction. By way of example, a metal support for the plant is mentioned, but the carrier may also be embodied as a cord or the like by means of which the plant is suspended, for example, from the top of a greenhouse by means of, for example, a central cord. Further variants of the further plant carrier are conceivable.

Rotation of the plant carrier may be carried out by hand or in a mechanized manner.

BRIEF DESCRIPTION OF THE DRAWING FIGURES

The invention will be explained below with reference to an exemplary embodiment illustrated in the drawings, in which:

FIG. 1 diagrammatically shows a first exemplary embodiment of the invention while a stem is being wound onto a substrate.

FIG. 2 shows a detail view of the cross section along II-II from FIG. 1;

Figure 4A:
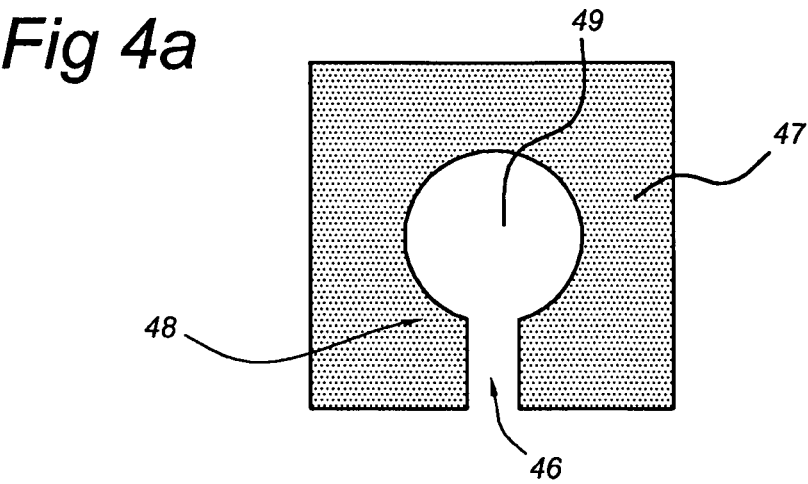
Figure 4B:
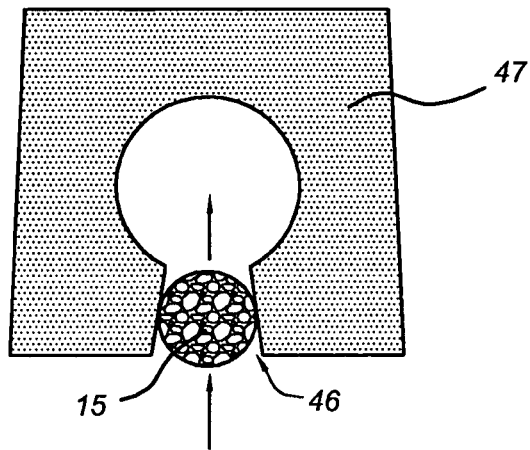
Figure 4C:
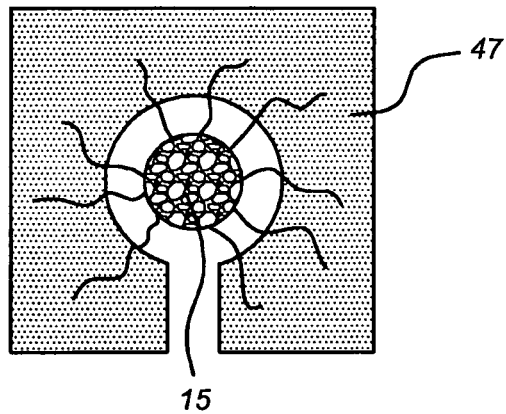

FIG. 4a-c shows a variant of the substrate; and

Figure 5:
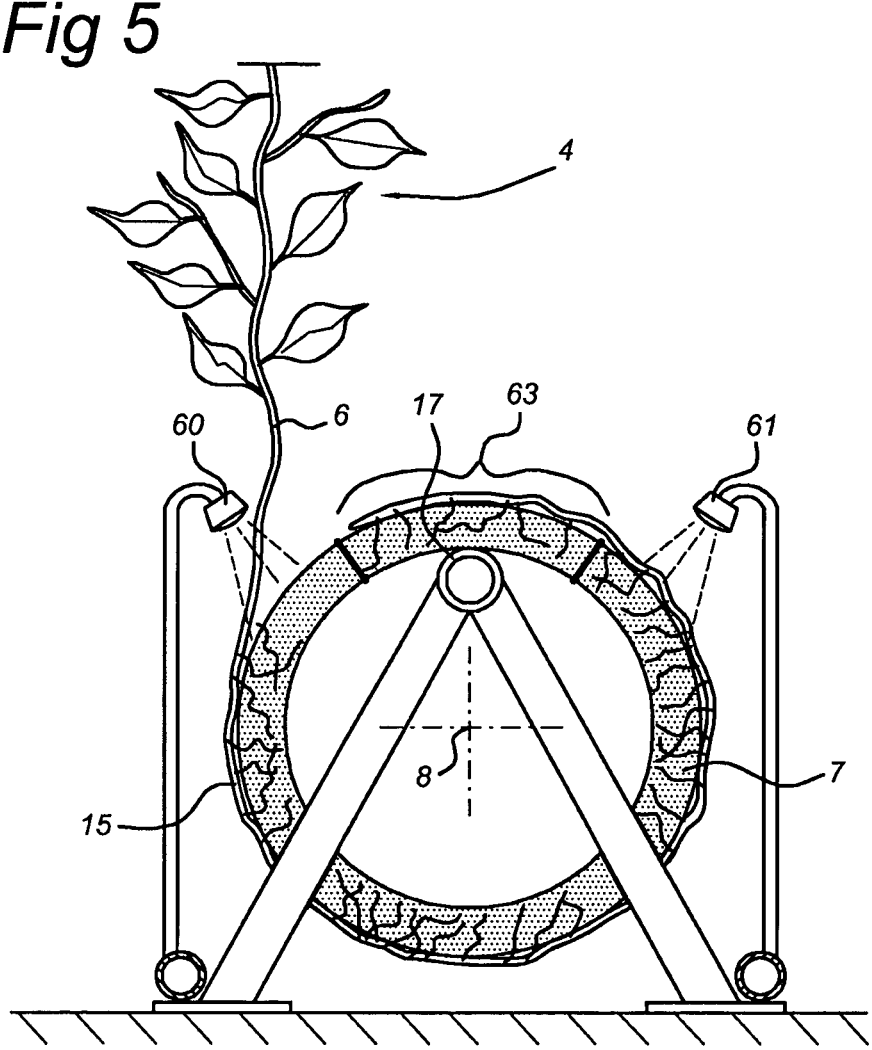

FIG. 5 shows a further modification of the embodiment illustrated in FIG. 1.

DETAILED DESCRIPTION OF THE INVENTION

In FIG. 1, a device according to the present invention is denoted overall by reference numeral 1. A plant 4 having roots 5 and a stem 6 is present. In the cultivation space, a stationary frame 11 is present around which a ring-shaped substrate 7 can rotate. In practice, two or more frames which are arranged at a distance from one another will be present with a tube 17 extending between them, which tube 17 supports the ring 7. The ring 7 is illustrated in cross section in FIG. 2 and comprises a groove 13 for receiving the stem. The ring 7 comprises substrate material, that is to say material which can receive and retain moisture and nutrients and forms a good nutrient medium for the plant to develop in.

The substrate ring 7 is rotatable about horizontal axis 8.

Part of the stem 6 is accommodated in the groove 13 and this part is denoted by reference numeral 15. If the plant 4 grows in the vertical direction, the substrate ring 7 will be moved in the direction of the arrow 18 when the plant becomes excessively tall and moves down. A cutting device 19 is present for removing leaves and other parts which extend from the stem 6. As a result of the stem portion 15 coming to lie in the substrate ring 7, which substrate ring is regularly moistened, the stem portion 15 will form roots. As soon as the roots are sufficiently well developed to provide the plant with the necessary fluids and the like, the stem portion which is situated furthest downstream and where the roots 5 are situated can be removed. This part is denoted by reference numeral 16.

The plant 4 may be retained in the vertical position illustrated in FIG. 1 in any manner known in the prior art or may even be sufficiently stiff to achieve this position. In principle, the plant 4 moves downwards along a vertical line until it reaches the substrate ring 7 and is subsequently wound up.

It will be clear that a number of plants can be arranged one behind the other on an elongate substrate ring and can be wound up simultaneously.

Figure 3:
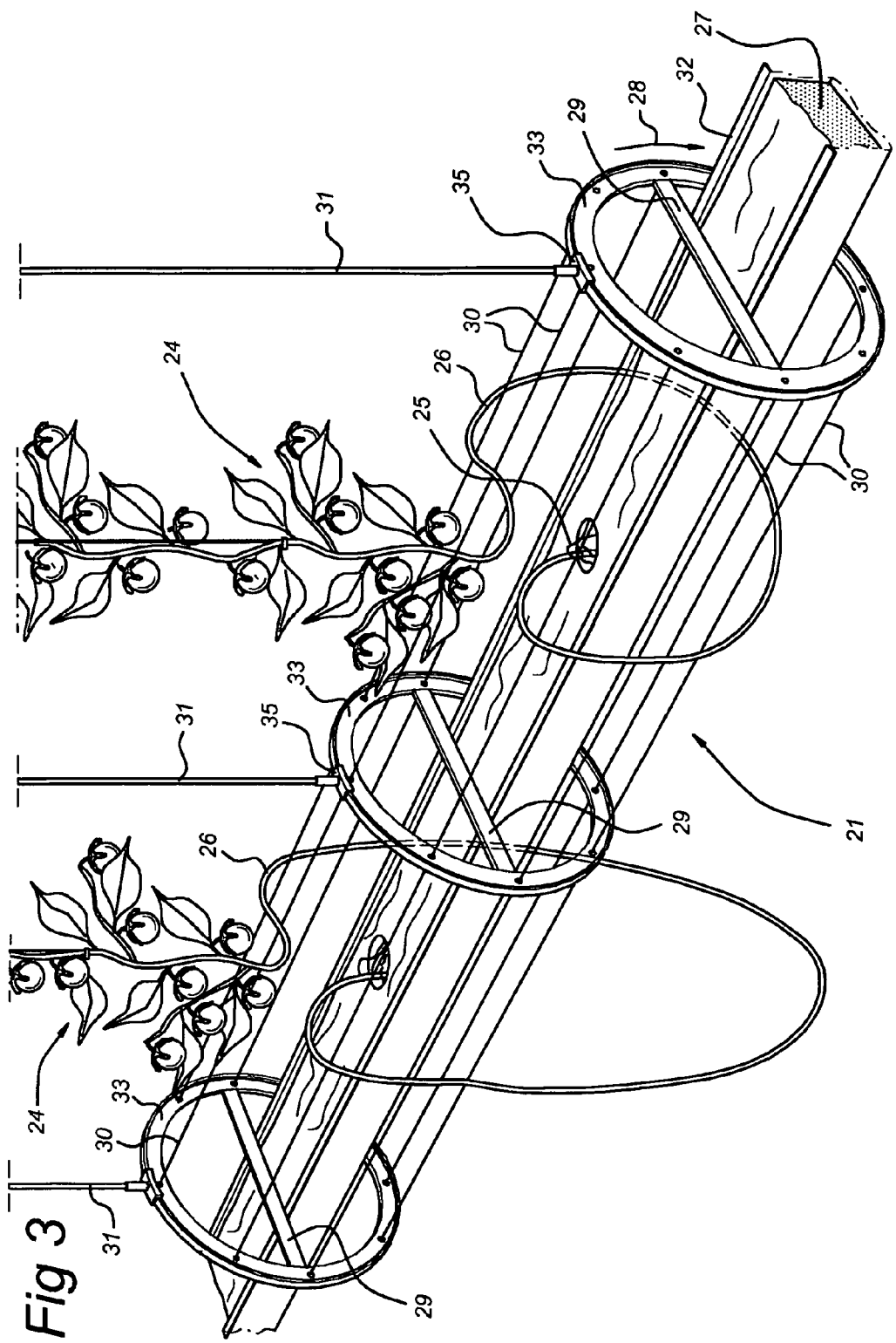
FIG. 3 shows a second variant of the present invention.

FIG. 3 shows a variant of the invention. Therein, the device is denoted overall by reference numeral 21. Various plants 24 are present, each of which is, by means of a root 25, accommodated in substrate 27 arranged in a gutter 32. By means of cross bars 29, said gutter 32 is supported on a ring 33 which is attached to cable 31. This method of attachment allows mutual displacement, i.e. rings 33 can rotate with respect to attachment means 35. Cables 31 are attached to the superstructure of the cultivation space. The direction of rotation of the ring 33 is denoted by reference numeral 28.

Elongate elements or cords or rods 30 extend between two rings 33.

The above-described device operates as follows: when the height of the plant 24 is threatening to become excessive, the stem 26 is wound around the cords 30. This is achieved by rotation of the rings 33. Preferably, rotation in each case takes place over a complete turn, i.e. 360°, as a result of which the gutter again ends up in the horizontal starting position. Obviously, measures have been taken to retain the substrate 27 inside the gutter 32 during rotation. It is possible to wind the stem around the elements 30 relatively tightly, as is illustrated on the far right in FIG. 3, but it is also possible to pass the stem around the elements 30 relatively loosely, as is illustrated on the left-hand side in FIG. 3.

Any number of cords 30 may be used to approximate a ring shape. According to a preferred embodiment, approximately 6 cords are used.

FIGS. 4a-c show a substrate 47 which, for example, comprises a foam-like material provided with a keyhole-shaped opening 48 consisting of a round part 49 and an inlet slot 46. FIG. 4b shows how the stem 15 is introduced into the insertion slot 46 and eventually reaches the locked position, as is illustrated in FIG. 4c. In this position, the stem is enclosed on all sides and can be supplied with moisture from all sides so that roots can develop on all sides.

FIG. 5 shows a detail view of a variant of the construction shown in FIG. 1. The parts which correspond to those illustrated in FIG. 1 are denoted by the same reference numerals. In this variant, spray nozzles 60 and 61 are present which are directed in such a manner that an area 63 is not supplied with moisture. In addition, this is embodied in such a manner that no moisture can reach this area 63 by means of the substrate either.

It has been found that the part of the stem which is situated there dies and can be removed in a very simple manner.

Upon reading the above, those skilled in the art will immediately be able to think of variants. After all, there are many different ways of executing a rotating movement which results in a plant stem being stored and, optionally, also in the plant stem taking root and being shortened.

In addition, all kinds of structures are conceivable for mechanically intermittently or continuously driving the plant carrier, optionally in combination with means for removing leaves and other parts of the plant. In principle, it is possible to rotate very substantial lengths of the winding ring, as a result of which a large number of plants can be moved, that is to say lowered.

Such variants are within the scope of the attached claims.

The invention claimed is:

1. A method for growing a plant, comprising:
   placing the plant in a ring-shaped substrate at a specific location;
   growing the plant from said location;
   lowering a top part of said plant; and changing an orientation of a bottom end part of said plant with respect to an environment and with respect to the top part of said plant, wherein changing said orientation of the bottom end part of said plant comprises moving said location by rotation, and during rotation the bottom end part is wound up on the ring-shaped substrate; substantially not changing an orientation of a non-rotating moved part of the plant during rotation.

2. The method according to claim 1, wherein said rotation comprises:

winding-up the plant, with a roll axis being substantially horizontal.

3. The method according to claim 1, further comprising:

subjecting said plant to a treatment when the plant is being moved by rotation.

4. The method according to claim 3, wherein said treatment comprises:

removing protuberances from a plant stem.

5. The method according to claim 3, wherein said treatment comprises:

arranging a last plant moved by rotation in the substrate.

6. The method according to claim 5, further comprising:

removing a free root end of the plant moved by rotation from the substrate.

7. The method according to claim 1, further comprising:

forming the substrate from foam.

8. The method according to claim 1, further comprising:

forming the substrate with keyhole-shaped opening with a round part and an inlet slot.

9. The method according to claim 1, further comprising:

inserting a stem of the plant in the inlet slot until the stem reaches a locked position.

10. The method according to claim 1, further comprising:

receiving a stem of the plant in a groove in the substrate.

* * * * *

UNITED STATES PATENT AND TRADEMARK OFFICE
CERTIFICATE OF CORRECTION

PATENT NO. : 8,429,850 B2  Page 1 of 1
APPLICATION NO. : 12/666502
DATED : April 30, 2013
INVENTOR(S) : Fred van Zijl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 485 days.

Signed and Sealed this
Eighth Day of September, 2015

Michelle K. Lee
*Director of the United States Patent and Trademark Office*